United States Patent
Babl et al.

(10) Patent No.: US 10,647,583 B2
(45) Date of Patent: May 12, 2020

(54) FLUIDIZED BED REACTOR FOR PREPARING CHLOROSILANES

(71) Applicant: Wacker Chemie AG, Munich (DE)

(72) Inventors: Maximilian Babl, Marktl (DE); Sebastian Liebischer, Muehldorf (DE)

(73) Assignee: WACKER CHEMIE AG, Munich (DE)

( * ) Notice: Subject to any disclaimer, the term of this patent is extended or adjusted under 35 U.S.C. 154(b) by 277 days.

(21) Appl. No.: 15/562,660

(22) PCT Filed: Mar. 16, 2016

(86) PCT No.: PCT/EP2016/055723
§ 371 (c)(1),
(2) Date: Sep. 28, 2017

(87) PCT Pub. No.: WO2016/156047
PCT Pub. Date: Oct. 6, 2016

(65) Prior Publication Data
US 2018/0105427 A1   Apr. 19, 2018

(30) Foreign Application Priority Data
Mar. 30, 2015   (DE) .................. 10 2015 205 727

(51) Int. Cl.
C01B 33/107 (2006.01)
B01J 8/18 (2006.01)
B01J 19/02 (2006.01)

(52) U.S. Cl.
CPC ....... *C01B 33/10763* (2013.01); *B01J 8/1872* (2013.01); *B01J 19/02* (2013.01); *C01B 33/1071* (2013.01); *C01B 33/10757* (2013.01); *B01J 2219/0204* (2013.01); *B01J 2219/0218* (2013.01)

(58) Field of Classification Search
CPC ............... B01J 19/02; B01J 2219/0204; B01J 2219/0218; B01J 8/187; C01B 33/1071; C01B 33/10757; C01B 33/10763
See application file for complete search history.

(56) References Cited

U.S. PATENT DOCUMENTS

| 3,645,700 A | 2/1972 | Nagamura et al. |
| 4,059,544 A * | 11/1977 | Yamaguchi ............... B01J 33/00 502/324 |
| 4,092,446 A | 5/1978 | Padovani et al. |
| 7,935,236 B2 * | 5/2011 | Marshall ................ B01D 61/56 204/228.1 |
| 2004/0047794 A1 | 3/2004 | Pfaffelhuber et al. |
| 2009/0047204 A1 | 2/2009 | Kim et al. |
| 2009/0060818 A1 | 3/2009 | Bill, Jr. et al. |
| 2010/0215562 A1 | 8/2010 | Sanchez et al. |
| 2013/0108519 A1 | 5/2013 | Sandacz |
| 2015/0030520 A1 | 1/2015 | Dassel |
| 2015/0147236 A1 | 5/2015 | Simon et al. |

FOREIGN PATENT DOCUMENTS

| DE | 3640172 C1 | 8/1988 |
| DE | 3739578 C2 | 11/1989 |
| DE | 19654154 A1 | 6/1997 |
| JP | 2010500274 T2 | 1/2010 |
| KR | 20140069138 A | 6/2014 |
| KR | 20140136985 A | 12/2014 |
| TW | 201034757 A | 10/2010 |
| WO | 0249754 A1 | 6/2002 |
| WO | 08088465 A1 | 7/2008 |
| WO | 13062676 A1 | 5/2013 |
| WO | 14009625 A1 | 1/2014 |

* cited by examiner

*Primary Examiner* — Ngoc-Yen Nguyen
(74) *Attorney, Agent, or Firm* — Brooks Kushman P.C.

(57) ABSTRACT

The lifetime of a fluidized bed reactor containing silicon particles, for the production of chlorosilanes is greatly extended by armoring at least a portion of the reactor shell interior wall with expanded metal coated with a cement containing ceramic particles.

16 Claims, No Drawings

FLUIDIZED BED REACTOR FOR PREPARING CHLOROSILANES

CROSS REFERENCE TO RELATED APPLICATIONS

This application is the U.S. National Phase of PCT Appln. No. PCT/EP2016/055723 filed Mar. 16, 2016, which claims priority to German Application No. 10 2015 205 727.5 filed Mar. 30, 2015, the disclosures of which are incorporated in their entirety by reference herein.

BACKGROUND OF THE INVENTION

1. Field of the Invention

The invention relates to a fluidized bed reactor for preparing chlorosilanes.

2. Description of the Related Art

Polycrystalline silicon, which is employed in the photovoltaics or semiconductor industries for example, is prepared from the feedstock trichlorosilane (TCS). This TCS is primarily produced by three different processes.

$$Si + 3HCl \rightarrow SiHCl_3 + H_2 + \text{byproducts} \qquad A)$$

$$Si + 3SiCl_4 + 2H_2 \rightarrow 4SiHCl_3 + \text{byproducts} \qquad B)$$

$$SiCl_4 + H_2 \rightarrow SiHCl_3 + HCl + \text{byproducts} \qquad C)$$

The preparation of trichlorosilane according to A) and B) is carried out in a fluidized bed reactor. In order to produce high-purity trichlorosilane this is followed by a distillation.

U.S. Pat. No. 4,092,446 A discloses a reactor in which hydrogen chloride is passed through a bed of silicon particles. The hydrogen chloride reacts with the silicon particles to afford silicon tetrachloride (STC) and TCS and hydrogen.

Hydrogenation of STC to form TCS is likewise known. This is effected by reacting STC with hydrogen to form TCS and hydrogen chloride. The conversion of silicon tetrachloride with hydrogen to afford trichlorosilane is typically carried out in a reactor at high temperatures, at not less than 600° C., ideally at not less than 850° C. (high temperature conversion).

DE 196 54 154 A1 discloses a process for preparing trichlorosilane, characterized in that silicon particles, tetrachlorosilane and hydrogen are reacted in a fluidized bed in the presence of an added copper-silicide-containing catalyst at 400° C. to 700° C.

US 2009/0060818 A1 claims, for example, a process for preparing TCS by reacting silicon with HCl, or STC with hydrogen in the presence of silicon and catalysts. Catalysts employed include, for example, Fe, Cu, Al, V. Sb or compounds thereof. The silicon and catalysts are laminated together and reduced in particle size prior to reaction.

Most STC today is generated in the course of polycrystalline silicon deposition. Polycrystalline silicon is produced by the Siemens process, for example. This comprises depositing silicon on heated slim rods in a reactor. The process gas used as the silicon-containing component is a halosilane such as TCS in the presence of hydrogen. This makes it possible to produce TCS from the SIC byproduced in the deposition and to feed that TCS back to the deposition process in order to produce elemental silicon.

It is known that the walls of the fluidized bed reactors are subjected to severe abrasive stress by the fluidized silicon particles during preparation of TCS. The ground silicon has a high hardness and thus results in abrasion of the metallic constituents of the reactor. The wall of the reactor in particular is attacked. This abrasion results in a maximum reactor uptime of 36 weeks. After that, the middle part of the reactor requires costly and inconvenient repairs. After about four operating cycles the reactor part is scrap and requires replacement with a new part.

WO 2014/009625 A1 and WO 2013/062676 A1 describe a crack reactor and a riser reactor, respectively, which are each provided with a corrosion protection layer made of cement. The cement layer is in each case applied to a honeycomb metallic anchoring structure.

DE 36 40 172 C1 discloses a reactor made of a nickel-containing material of icy construction for reacting granular Si-metal-containing material in a fluidized bed to form chlorosilanes, characterized in that for a reactor for reacting granular Si-metal-containing material with hydrogen chloride the material of construction that comes into contact with the fluidized Si-metal-containing material has a nickel content of at least 40 wt %, in particular more than 98 wt %, wherein for nickel contents up to 95 wt % the material of construction comprises titanium in amounts between 0.5 and 4 wt % in addition to the further constituents of the material of construction. The reactor is completely or partly fabricated from a material of construction which exhibits long-term resistance towards attrition wear by the fluidized Si-metal-containing material.

WO 2008/088465 A1 discloses abrasion-resistant materials of construction for fluidized bed reactors. To this end, the heat exchangers are at least partly provided with a coating comprising hard metal particles such as tungsten carbide distributed in a matrix. The hard metal layer is metallurgically bonded to the heat exchanger surface.

However, linings and coatings with nickel or hard metal particles are relatively costly. Complete lining with silicon carbide (SiC) would also be prohibitively expensive. Moreover, for larger components an SiC lining would be technically very difficult to implement.

The object to be achieved by the invention arose from the problems described. In particular, the invention has for its object the identification of alternative and less costly abrasion-resistant materials of construction for lining fluidized bed reactors.

SUMMARY OF THE INVENTION

The objects of the invention are achieved by a fluidized bed reactor for preparing chlorosilanes which comprises a reactor shell made of steel, characterized in that an inner wall of the reactor shell has an expanded metal welded onto it and the expanded metal has cement comprising ceramic particles applied to it. The invention further relates to the preparation of chlorosilanes in such a reactor.

DETAILED DESCRIPTION OF THE PREFERRED EMBODIMENTS

The invention also provides a process for applying an abrasion protection to a steel surface of a fluidized bed reactor which comprises welding an expanded metal onto the steel surface, mixing cement comprising ceramic particles with water to produce a suspension, applying the mixed cement to the steel surface and drying and curing the cement for 10-30 days.

The reactor is preferably a fluidized bed reactor for reacting ground, metallic silicon with hydrogen chloride to afford chlorosilanes, more specifically to afford tetra- and trichlorosilane, and/or ground, metallic silicon with tetrachlorosilane and hydrogen to afford trichlorosilane in a fluidized bed.

The reactor comprises, on the inner wall of the reactor shell, an abrasion protection applied in the form of mortar/cement. It has been found that this can increase the lifetime of the reactor envelope by a factor of 4.

In a departure from the prior art, no abrasion-resistant plating is applied to the base material. The reactor inner wall is instead lined with an abrasion-resistant render. The mortar is much more resistant towards abrasion than the plating materials. Replacement of the render is moreover much easier to accomplish than replacement of a plating or a repair to the base material. Finally, abrasion-resistant mortars are much less costly than abrasion-resistant platings.

The reactor preferably comprises a reactor shell, a feed for the gaseous HCl and/or $H_2$ and STC, a feed for metallic silicon and a takeoff for chlorosilanes prepared. Depending on the implementation, internal cooling elements may be present.

The ground, metallic silicon is fluidized using HCl and/or $H_2$ and STC in the reactor, where the pressure in the reactor is typically 1-30 bar, and the temperature is preferably 300-600° C.

The reactor shell material may be made of carbon steel, stainless steel or higher icy alloyed steels (for example nickel-based materials of construction such as Hastelloy, Incolloy).

The inner wall of the reactor shell has an expanded metal welded onto it.

The term "expanded metal" is to be understood as meaning a material of construction having apertures in its surface. These apertures are formed without loss of material via offset cuts with simultaneous stretching deformation.

Examples of customary mesh aperture shapes include: diamond, long-bond, hexagonal, round, square and special. Expanded metals are employed, inter alia, as render carriers in construction and in the cladding of ceilings, walls and façades.

The starting material for the expanded metal is preferably sheet steel or stainless steel in thicknesses of 1 to 5 mm.

The mesh apertures are preferably square, rectangular or diamond-shaped. The mesh apertures preferably have a side length of 10 to 50 mm.

The cement (CaO) applied to the inner wall of the reactor shell/the expanded metal comprises ceramic particles. The ceramic particles are made of a material selected from the group consisting of silicon carbide, silicon nitride, boron nitride, zirconium oxide and aluminium nitride. It is also possible to employ ceramic particles made of different materials from the abovementioned group in combination. It is particularly preferable when the ceramic particles are SiC particles or $Si_3N_4$ particles. In one embodiment the cement comprises one or more additives selected from the group consisting of $SiO_2$, $Al_2O_3$, $TiO_2$, Cr6+ (for example $CrO_3$) and $Fe_2O_3$.

The reactor inner wall has welded onto it an expanded metal, onto which the cement is applied. The cement is mixed with some water and introduced as a suspension into the reactor onto the expanded metal. The thickness of the cement layer is preferably 5-50 mm. In a second step the cement is dried at ambient temperature. The curing/drying time is 10-30 days.

The use of an SiC-based mortar allows the reactor to be operated for up to 65 weeks. The mortar must then be removed and replaced with new mortar. The middle part of the reactor may then be used for at least 12 years.

The advantage of this cement is its low purchase cost compared to platings and linings with Ni-containing materials of construction, tungsten carbide, of SiC. Introduction into the reactor is relatively simple. In addition, wear-resistance is relatively high.

The features cited in connection with the abovedescribed embodiments of the processes according to the invention may be correspondingly applied to the apparatus according to the invention. Conversely, the features cited in connection with the abovedescribed embodiments of the apparatus according to the invention may be correspondingly applied to the processes according to the invention. These and other features of the embodiments according to the invention are elucidated in the claims. The individual features may be realized either separately or in combination as embodiments of the invention. Said features may further describe advantageous implementations eligible for protection in their own right.

The disclosure of the invention hereinabove enables a person skilled in the art to understand the present invention and the advantages associated therewith and also encompasses alterations and modifications to the described structures and processes obvious to a person skilled in the art. All such alterations and modifications and also equivalents shall therefore be covered by the scope of protection of the claims.

The invention claimed is:

1. A fluidized bed reactor for preparing chlorosilanes, comprising a metal reactor shell, wherein an inner wall of the reactor shell has expanded metal attached thereto, and the expanded metal is coated with a cement comprising ceramic particles, wherein the ceramic particles comprise silicon carbide, silicon nitride, boron nitride, zirconium oxide, aluminium nitride, or mixtures thereof.

2. The fluidized bed reactor of claim 1, wherein the cement further comprises one or more additives selected from the group consisting of $SiO_2$, $Al_2O_3$, $TiO_2$, compounds containing $Cr^{6+}$, and $Fe_2O_3$.

3. The fluidized bed reactor of claim 1, wherein the cement has a layer thickness of 5-50 mm.

4. The fluidized bed reactor of claim 2, wherein the cement has a layer thickness of 5-50 mm.

5. The fluidized bed reactor of claim 2, wherein the expanded metal is attached to the inner wall by welding.

6. A process for applying abrasion protection to a steel surface of a fluidized bed reactor, comprising attaching an expanded metal onto the steel surface, mixing cement comprising ceramic particles with water to produce a suspension, applying the mixed cement to the expanded metal and drying and curing the cement, wherein the ceramic particles comprise one or more of silicon carbide, silicon nitride, boron nitride, zirconium oxide and aluminium nitride.

7. The process of claim 6, wherein the mixed cement is allowed to cure for 10-30 days after application to the expanded metal and before use.

8. The process of claim 6, wherein the cement further comprises one or more additives selected from the group consisting of $SiO_2$, $Al_2O_3$, $TiO_2$, compounds containing $Cr^{6+}$ and $Fe_2O_3$.

9. The process of claim 6, wherein the cement has a layer thickness of 5-50 mm.

10. The process of claim 8, wherein the cement has a layer thickness of 5-50 mm.

11. In a process for preparing chlorosilanes, by reacting ground, metallic silicon with hydrogen chloride to afford tetra- and trichlorosilane in a fluidized bed or by reacting ground, metallic silicon with tetrachlorosilane and hydrogen to afford trichlorosilane in a fluidized bed, the improvement comprising conducting the reacting in a fluidized bed reactor of claim 1.

12. The process of claim 11, wherein the fluidized bed reactor is operated at a pressure of 1-30 bar.

13. The process of claim 11, wherein the reaction is effected at a temperature of 300-600° C.

14. The process of claim 12, wherein the reaction is effected at a temperature of 300-600° C.

15. The fluidized bed reactor of claim 2, wherein the compound containing $Cr^{6+}$ comprises $CrO_3$.

16. The process of claim 8, wherein the compound containing $Cr^{6+}$ comprises $CrO_3$.

* * * * *